(12) United States Patent
Tomioka et al.

(10) Patent No.: US 9,213,202 B2
(45) Date of Patent: Dec. 15, 2015

(54) LIQUID CRYSTAL DISPLAY DEVICE

(71) Applicant: Japan Display Inc., Tokyo (JP)

(72) Inventors: Yasushi Tomioka, Hitachinaka (JP); Noboru Kunimatsu, Chiba (JP); Hidehiro Sonoda, Mobara (JP); Yasuo Imanishi, Katano (JP); Koichi Igeta, Chiba (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/339,492

(22) Filed: Jul. 24, 2014

(65) Prior Publication Data

US 2014/0333885 A1    Nov. 13, 2014

Related U.S. Application Data

(63) Continuation of application No. 13/550,632, filed on Jul. 17, 2012, now Pat. No. 8,797,496.

(30) Foreign Application Priority Data

Jul. 21, 2011    (JP) .................................. 2011-159795

(51) Int. Cl.
G02F 1/1339    (2006.01)
G02F 1/1362    (2006.01)

(52) U.S. Cl.
CPC .......... *G02F 1/1339* (2013.01); *G02F 1/13392* (2013.01); *G02F 1/13394* (2013.01); *G02F 1/136227* (2013.01); *G02F 2001/13396* (2013.01)

(58) Field of Classification Search
CPC ................... G02F 2001/13396; G02F 1/13394

USPC .................................................. 349/157, 155
See application file for complete search history.

(56) References Cited

U.S. PATENT DOCUMENTS

2004/0189928 A1    9/2004    Yang et al.
2007/0002263 A1    1/2007    Kim et al.
(Continued)

FOREIGN PATENT DOCUMENTS

JP    2001-222234 A    8/2001
JP    2003-5190    1/2003
(Continued)

OTHER PUBLICATIONS

Office communication in corresponding Taiwanese Patent Application No. 101126139, with English translation.
(Continued)

*Primary Examiner* — Thanh-Nhan P Nguyen
(74) *Attorney, Agent, or Firm* — Lowe Hauptman & Ham, LLP

(57) ABSTRACT

A display device includes a first substrate having a plurality of TFTs, a passivation film, and a plurality of pixel electrodes, and a second substrate arranged with a gap with the first substrate. The passivation film has a plurality of contact holes, and the plurality of pixel electrodes are connected to the plurality of TFTs via the plurality of contact holes. The second substrate has a plurality of columnar spacers for ensuring the gap with the first substrate, and a plurality of columnar projections for misalignment prevention formed at positions corresponding to the contact holes. The number of the plurality of columnar projections is less than the number of the plurality of columnar spacers.

10 Claims, 3 Drawing Sheets

(56) References Cited

U.S. PATENT DOCUMENTS

| | | | |
|---|---|---|---|
| 2007/0002264 A1* | 1/2007 | Kim | 349/156 |
| 2009/0079927 A1 | 3/2009 | Yamamoto et al. | |
| 2009/0231522 A1* | 9/2009 | Kim et al. | 349/106 |
| 2011/0164213 A1 | 7/2011 | Nakanishi et al. | |
| 2012/0081640 A1 | 4/2012 | Kim et al. | |
| 2012/0081641 A1 | 4/2012 | Noh et al. | |

FOREIGN PATENT DOCUMENTS

| | | |
|---|---|---|
| JP | 2003-84290 | 3/2003 |
| JP | 2003-131238 | 5/2003 |
| JP | 2007-11272 | 1/2007 |
| JP | 2009-069391 A | 4/2009 |
| JP | 2009-109658 | 5/2009 |
| JP | 2011-22535 | 2/2011 |
| KR | 10-0740041 | 1/2007 |
| TW | 2007-41259 | 11/2007 |

OTHER PUBLICATIONS

Office Action dated on Feb. 3, 2015 regarding Japanese Patent Application No. 2011-159795.
Office communication in corresponding Taiwanese Patent Application No. 101126139, with English translation, Sep. 16, 2014.

* cited by examiner 220    210

◉ COLUMNAR PROJECTION
○ COLUMNAR SPACER

LIQUID CRYSTAL DISPLAY DEVICE

CROSS REFERENCE TO RELATED APPLICATION

This application is a continuation of U.S. application Ser. No. 13/550,632, filed Jul. 17, 2012, the contents of which are incorporated herein by reference.

CLAIM OF PRIORITY

The present application claims priority from Japanese patent application JP2011-159795 filed on Jul. 21, 2011, the content of which is hereby incorporated by reference into this application.

BACKGROUND OF THE INVENTION

1. Field of the Invention

The present invention relates to a liquid crystal display device, and in particular relates to a liquid crystal display device in which misalignment between upper and lower substrates is suppressed.

2. Description of the Related Art

A liquid crystal display device has a configuration that a thin-film transistor (TFT) substrate in which a pixel electrode, a TFT and the like are formed in a matrix, and an opposite substrate in which a color filter and the like are formed at a position corresponding to that of the pixel electrode of the TFT substrate are arranged with a predetermined gap therebetween, and liquid crystal is retained in the gap between the TFT substrate and the opposite substrate. To regulate the gap between the TFT substrate and the opposite substrate to be constant, a columnar spacer is interposed between the substrates.

In a liquid crystal display device, when a temperature change occurs between upper and lower substrates due to a use environment condition or lighting of a backlight, because rates of thermal expansion of the upper and lower substrates are different, misalignment of one substrate to another substrate in a surface direction occurs, and a display failure occurs due to occurrence of uneven brightness caused by misalignment between a pixel region of the upper substrate and a pixel region of the lower substrate and a bright spot caused by shaving of an orientation film associated with the misalignment in a surface direction. In particular, when a screen size is large or thickness of polarizing plates laminated on the upper and lower substrates are different, misalignment between the upper and lower substrates in a surface direction becomes more significant.

About regulation of an interval between substrates and prevention of misalignment between upper and lower substrates, Japanese Patent Application Laid-Open Publication No. 2003-131238 discloses that columnar spacers having different height are formed on one substrate, reduction of a frictional resistance between the substrate and an opposite substrate is attempted with a taller spacer, and a cell gap between the substrates is finally ensured with a shorter spacer.

Japanese Patent Application Laid-Open Publication No. 2003-84290 discloses a liquid crystal display device in which a columnar spacer for maintaining a substrate gap is arranged in a pixel electrode at a contact portion that supplies electrical signals to the pixel electrode to realize stable control of a panel gap without impairing display quality and an aperture ratio of pixels.

Also, Japanese Patent Application Laid-Open Publication No. 2003-5190 discloses that to suppress a variation in inter-substrate positions and a cell gap caused by a positional variation of a columnar spacer due to application of an external force, a top part of the columnar spacer formed fixedly at an inner surface of one of a pair of substrates is positioned at a concave part of a multilayer structure film of another substrate.

SUMMARY OF THE INVENTION

Japanese Patent Application Laid-Open Publication No. 2003-131238 has a problem in that although a frictional resistance between substrates is reduced so that misalignment between the substrates that has occurred can be easily fixed by bringing only the taller columnar spacer among the columnar spacers having different height into contact with the opposite substrate, occurrence of misalignment between the substrates itself cannot be suppressed.

Japanese Patent Application Laid-Open Publication No. 2003-84290 has a problem in that to form the columnar spacer to match the contact portion, it is necessary to make an area of a hole bottom part larger than an area of a spacer top part taking into account a positional accuracy of spacer formation (alignment margin), and expansion of the area of the contact portion lowers the pixel aperture ratio and transmittance.

Japanese Patent Application Laid-Open Publication No. 2003-5190 has a problem in that the concave part of the opposite substrate occupies a significantly large region as compared with the spacer formed between various wirings, and does not have a step such as a contact portion and lacks a positional accuracy; therefore, misalignment between the substrates itself cannot be suppressed.

An object of the present invention is to provide a liquid crystal display device that suppresses misalignment between upper and lower substrates, and prevents occurrence of uneven brightness due to misalignment between pixel regions and a bright spot caused by shaving of an orientation film to obtain a favorable image.

In order to address the above-described problems, a liquid crystal display device according to the present invention includes a TFT substrate in to which a pixel electrode, a TFT and the like are formed in a matrix; an opposite substrate in which a color filter and the like are formed at a position corresponding to a position of the pixel electrode and that is arranged with a predetermined gap with the TFT substrate; and a liquid crystal retained in the gap; wherein the TFT substrate retains a contact hole that is formed in a passivation film, and is for connecting the TFT and the pixel electrode; and the opposite substrate retains a columnar spacer for ensuring a cell gap, and a columnar projection for misalignment prevention formed at a position corresponding to a position of the contact hole.

In the liquid crystal display device according to the present invention, the passivation film may include an organic passivation film.

Also, in the liquid crystal display device according to the present invention, the passivation film may be comprised only of an inorganic passivation film.

Also, in the liquid crystal display device according to the present invention, a difference $\Delta h$ between height $h1$ of the columnar projection and height $h2$ of the columnar spacer with reference to the opposite substrate may be equal to or less than depth $z$ of the contact hole.

$$\Delta h = h1 - h2 \leq z$$

It is of note that when there is a difference $v$ between distance from the TFT substrate to a top surface of the contact hole and distance from the TFT substrate to a surface that contacts the columnar spacer, h1−(h2+v)≤z has to be satisfied.

Also, in the liquid crystal display device according to the present invention, height h1 of the columnar projection may be larger than a cell gap d, and may be smaller than a sum of the cell gap d and depth z of the contact hole.

$$d < h1 \leq d+z$$

Also, in the liquid crystal display device according to the present invention, the columnar projection may abut on a bottom part of the contact hole when an excessive force is applied thereto.

Also, in the liquid crystal display device according to the present invention, the contact hole may have an inclining part diameter of which is larger at an upper part.

Also, in the liquid crystal display device according to the present invention, a diameter of a top part of the columnar projection may be smaller than a diameter of an upper part of the contact hole.

Also, in the liquid crystal display device according to the present invention, a cross-sectional area of the columnar projection may be smaller than a cross-sectional area of the columnar spacer.

In the liquid crystal display device according to the present invention, density of the columnar projection may be higher at a peripheral area of a liquid crystal panel than at a center region.

In the liquid crystal display device according to the present invention, the columnar spacer may be arranged substantially uniformly over an entire screen of the liquid crystal panel.

In the liquid crystal display device according to the present invention, an interval between the columnar projections may be larger than an interval between the columnar spacers.

Also, in the liquid crystal display device according to the present invention, the number of the columnar projection is less than the number of the columnar spacer.

Also, in the liquid crystal display device according to the present invention, the number of the columnar projection may be less than the number of the columnar spacer by an order of magnitude or more.

The liquid crystal display device according to the present invention is an in-plane switching (IPS), twisted nematic (TN) or vertical alignment (VA) liquid crystal display device.

According to an aspect of the present invention, a cell gap can be ensured surely due to the columnar spacer. Also, misalignment between upper and lower substrates is suppressed by inserting and anchoring the columnar projection for misalignment prevention to the contact hole to prevent occurrence of uneven brightness due to misalignment between pixel regions and a bright spot caused by shaving of an orientation film. Accordingly, a favorable image can be obtained.

DETAILED DESCRIPTION OF THE INVENTION

Embodiments of the present invention are explained with reference to the drawings. In each drawing, identical components are given with identical numbers, and explanation thereof is not repeated.

First Embodiment

Figure 1A:
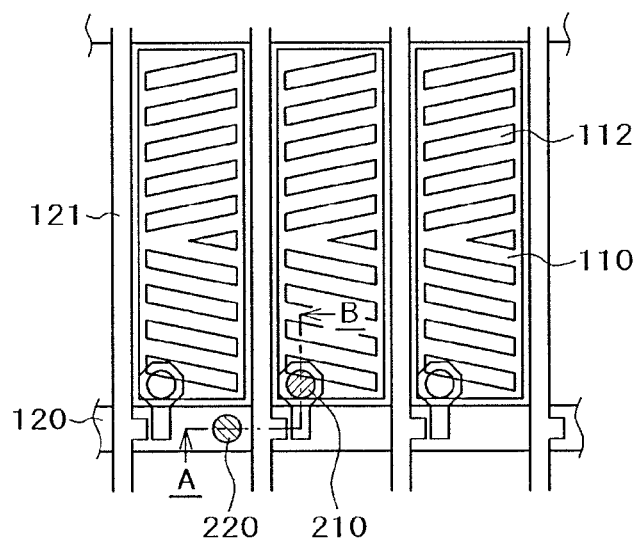
FIG. 1A is a plane view showing an IPS liquid crystal display device according to a first embodiment of the present invention.
Figure 1B:
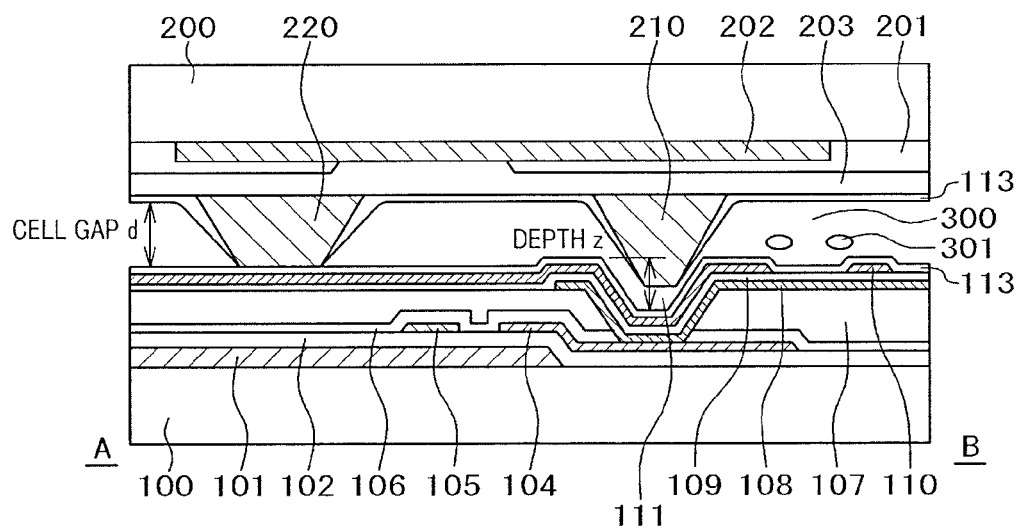
FIG. 1B is a cross-sectional view of a portion indicated with a line A-B in FIG. 1A.

A liquid crystal display device according to a first embodiment of the present invention is shown in FIGS. 1A and 1B. In the first embodiment, the present invention is applied to an IPS liquid crystal display device which is provided with a contact hole of an organic passivation film (an organic PAS film).

FIG. 1A is a plane view showing a part of the IPS liquid crystal display panel, and FIG. 1B is a cross-sectional view of a portion indicated with a line A-B in FIG. 1A.

Putting it simply, in the IPS liquid crystal display device, a comb-shaped opposite electrode 110 is formed on a pixel electrode 108 sandwiching an insulating film 109 therebetween, and an image is formed by rotating liquid crystal molecules 301 by voltage between the opposite electrode 110 and the pixel electrode 108, and controlling transmittance of light of a liquid crystal layer 300 for each pixel.

In FIG. 1A, a scanning line 120 and a signal line 121 are wired in a matrix on a TFT substrate 100. The pixel electrode 108 is arranged in a region surrounded by the scanning line 120 and the signal line 121, and a TFT is formed at a crossing part of the scanning line 120 and the signal line 121. The scanning line 120 is connected to a gate electrode of the TFT, and the signal line 121 is connected to a drain electrode of the TFT.

Hereinafter, a structure in FIG. 1B is explained in detail. The scanning line 120 and the gate electrode 101 are formed on the TFT substrate 100 formed with glass.

A gate insulating film 102 is formed covering the scanning line 120 and the gate electrode 101. A semiconductor layer (not shown in the drawings) is formed on the gate insulating film 102 at a position facing the gate electrode 101. The semiconductor layer forms a channel part of the TFT, and a source electrode 104 and a drain electrode 105 are formed on the semiconductor layer sandwiching the channel part. A motion image signal line doubles as the drain electrode 105, and the source electrode 104 is connected with the pixel electrode 108. The source electrode 104 and the drain electrode 105 are formed simultaneously on a same layer.

The semiconductor layer, the gate electrode 101, the source electrode 104 and the drain electrode 105 configure the TFT.

An inorganic passivation film 106 is formed covering the TFT. The inorganic passivation film 106 protects in particular the channel part of the TFT from impurities. An organic passivation film 107 is formed on the inorganic passivation film 106. The organic passivation film 107 plays a role of protecting the TFT and flattening a surface thereof, and thus is formed thick. Photosensitive acrylic resin, silicon resin, polyimide resin and the like are used for the organic passivation film 107. A contact hole 111 is formed in the organic passivation film 107 at a part that connects the pixel electrode 108 and the source electrode 104.

The pixel electrode 108 is formed on the organic passivation film 107. The pixel electrode 108 is formed by sputtering indium tin oxide (ITO), which is a transparent conductive film, over an entire display area, and patterning ITO for each pixel region. The contact hole 111 connects the pixel electrode 108 and the source electrode 104. The source electrode 104 that extends from the TFT and the pixel electrode 108 are electrically connected at the contact hole 111, and motion image signals are supplied to the pixel electrode 108.

An inorganic passivation film 109 is formed covering the pixel electrode 108. Thereafter, ITO to be the opposite electrode 110 is formed on the inorganic passivation film 109 by sputtering. The sputtered ITO is patterned to form the opposite electrode 110.

As shown in FIG. 1A, the opposite electrode 110 is a comb-shaped electrode whose both ends are closed. Slits 112 are formed between comb teeth. The planar pixel electrode 108 is formed below the opposite electrode 110. When motion image signals are supplied to the pixel electrode 108, the liquid crystal molecules 301 are rotated by an electric line of force generated between the pixel electrode 108 and the opposite electrode 110 through the slits 112. Thereby, an image can be formed by controlling light that passes through the liquid crystal layer 300.

Constant voltage is applied to the opposite electrode 110, and voltage due to the motion image signals is applied to the pixel electrode 108. When voltage is applied to the pixel electrode 108, an electric line of force occurs, the liquid crystal molecules 301 are rotated and directed toward the direction of the electric line of force, and transmission of light from a backlight is controlled. An image is formed because transmission of light from the backlight is controlled for each pixel.

In an example of FIGS. 1A and 1B, the pixel electrode 108 formed planarly is arranged on the organic passivation film 107, and the comb electrode 110 is arranged on the inorganic passivation film 109. However, on the contrary, the opposite electrode 110 formed planarly may be arranged on the organic passivation film 107, and the comb-shaped pixel electrode 108 may be arranged on the inorganic passivation film 109 in another case.

An orientation film 113 for orienting the liquid crystal molecules 301 is formed on the opposite electrode 110.

In FIG. 1B, an opposite substrate 200 is installed sandwiching the liquid crystal layer 300. Color filters 201 are formed on an inner side of the opposite substrate 200. Red, green and blue color filters are formed as the color filters 201 for each pixel, and thus a color image is formed. A light-shielding black matrix 202 is formed between the color filters 201 to improve contrast of an image. The light-shielding black matrix 202 also plays a role as a light-shielding film of the TFT, and prevents photocurrent from flowing through the TFT.

An overcoat film 203 is formed covering the color filters 201 and the light-shielding black matrix 202. Because the color filters 201 and the light-shielding black matrix 202 have irregular surfaces, the overcoat film 203 flattens the surfaces.

The orientation film 113 for deciding an initial orientation of liquid crystal is formed on the overcoat film 203.

In the present embodiment, as a characteristic configuration, a columnar projection 210 for misalignment prevention and a columnar spacer 220 for ensuring a cell gap are provided on the overcoat film 203 of the opposite substrate 200.

The columnar projection 210 is provided at a position corresponding to that of the contact hole 111 of the TFT substrate 100, and is inserted to the contact hole 111 when the TFT substrate 100 and the opposite substrate 200 are assembled. As shown in FIG. 1B, the contact hole 111 retains an inclining part such that a diameter of an upper part becomes larger than that of a bottom part, and the columnar projection 210 is inserted to the contact hole 111 by being guided by the inclining part. Thereby, by anchoring the columnar projection 210 with the contact hole 111, misalignment between the TFT substrate 100 and the opposite substrate 200 can be suppressed substantially completely.

The diameter of the top part of the columnar projection 210 is smaller than that of the contact hole 111, the columnar projection 210 can easily slide into the contact hole 111 when a load is applied at the time of panel assembly (ODF), and can easily be deformed when the columnar projection 210 hits against the inclining part of the contact hole 111, and the positional likelihood of the columnar projection 210 with the contact hole 111 can be enhanced.

The columnar spacer 220 is provided at a position such that the columnar spacer 220 overlaps the light-shielding black matrix 202 of the opposite substrate 200 and overlaps for example the gate wiring 120 at a position corresponding to a portion other than the contact hole 111 of the TFT substrate 100, and when the TFT substrate 100 and the opposite substrate 200 are assembled, the columnar spacer 220 abuts on the orientation film 113 to ensure the cell gap. To play a role as a spacer, a cross-sectional area of the columnar spacer 220 is larger than a cross-sectional area of the columnar projection 210.

Preferably, the columnar projection 210 does not contact the bottom part of the contact hole 111 in a normal state.

Therefore, the columnar projection 210 (h1) is larger than the cell gap (d) and is smaller than a sum of the cell gap (d) and depth (z) of the contact hole 111.

$$d < h1 \leq d+z$$

Also, a difference ($\Delta h$) between height (h1) of the columnar projection 210 and height (h2) of the columnar spacer 220 is equal to or less than the depth (z) of the contact hole 111.

$$\Delta h = h1 - h2 \leq z$$

It is of note that there is a case that a step part so-called pedestal is provided on the TFT substrate corresponding to the columnar spacer 220. In this case, there may be a difference v between distance from the TFT substrate 100 to a top surface of the contact hole 111, and distance from the TFT substrate 100 to a surface corresponding to the columnar spacer 220, that is, a surface that contacts the columnar spacer 220. In this case, $h1-(h2+v) \leq z$ has to be satisfied.

When an excessive load is applied to the substrates, the top part of the columnar projection 210 abuts on the bottom part of the contact hole 111, and functions as a spacer.

Figure 2:
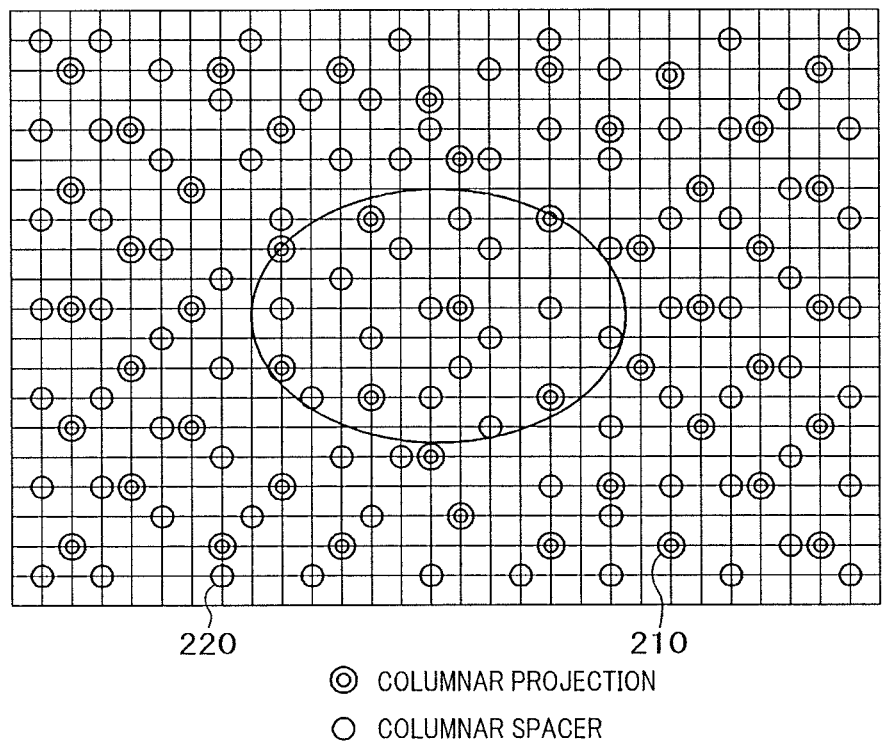
FIG. 2 is a diagram showing an arrangement of a columnar spacer in an entire liquid crystal panel.

FIG. 2 shows an arrangement of the columnar projection 210 and the columnar spacer 220 in the entire liquid crystal panel.

As shown in FIG. 2, density of the columnar projection 210 that functions as a misalignment prevention stopper is higher at a peripheral area than at a center area. Intra-surface misalignment due to a temperature change is caused because a warp is more significant at the peripheral part of a screen than at the vicinity of the center, and by increasing the density of the columnar projection 210 at the peripheral part, misalignment can be suppressed effectively. In contrast, the columnar spacer 220 for ensuring the cell gap is distributed substantially uniformly throughout the entire liquid crystal panel. Thereby, a cell gap interval can be ensured effectively throughout the entire liquid crystal panel.

The number of the columnar projection 210 is smaller than the number of the columnar spacer 220 by an order of magnitude or more, for example. Intervals between the columnar projections 210 are larger than intervals of the columnar spacer 220.

Second Embodiment

Figure 3:
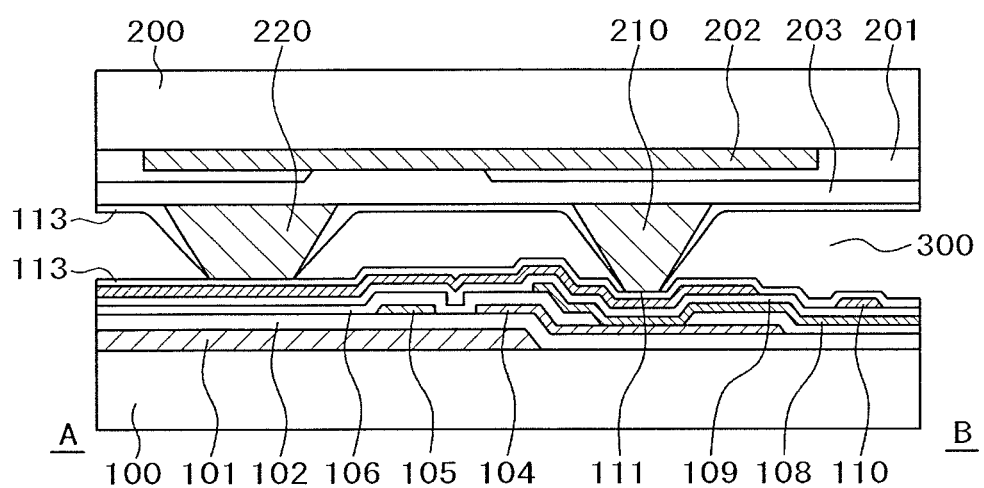
FIG. 3 is a diagram showing an IPS liquid crystal display device according to a second embodiment of the present invention.

FIG. 3 shows a liquid crystal display device according to a second embodiment of the present invention. In the second embodiment, the present invention is applied to an IPS liquid crystal display device provided with the contact hole 111 only of an inorganic passivation film (an inorganic PAS film).

While in the first embodiment, the inorganic passivation film 106, the organic passivation film 107 and the inorganic passivation film 109 are provided between the TFT and the pixel electrode 108 or the opposite electrode 110, only the inorganic passivation films 106, 109 are provided without providing the organic passivation film 107 in the present embodiment. Depth of the contact hole 111 is smaller by the thickness of the organic passivation film 107.

The tall columnar projection 210 and the short columnar spacer 220 are provided on the overcoat film 203 of the opposite substrate 200, and the columnar projection 210 is inserted to the contact hole 111 when the TFT substrate 100 and the opposite substrate 200 are assembled. Also, when the TFT substrate 100 and the opposite substrate 200 are assembled, the columnar spacer 220 abuts on the orientation film 113 to ensure the cell gap.

In the present embodiment, when a diameter of the top part of the columnar projection 210 is not sufficiently smaller compared to a hole diameter of the contact hole 111, the columnar projection 210 is deformed and fixed due to a load at the time of panel assembly (ODF).

In the present embodiment, the contact hole 111 plays a role of a pedestal having a concave shape corresponding to a shape of the columnar projection 210; thereby, a frictional resistance between the upper and lower substrates becomes significantly large, and an effect of suppressing misalignment between the upper and lower substrates can be enhanced.

Third Embodiment

Figure 4A:
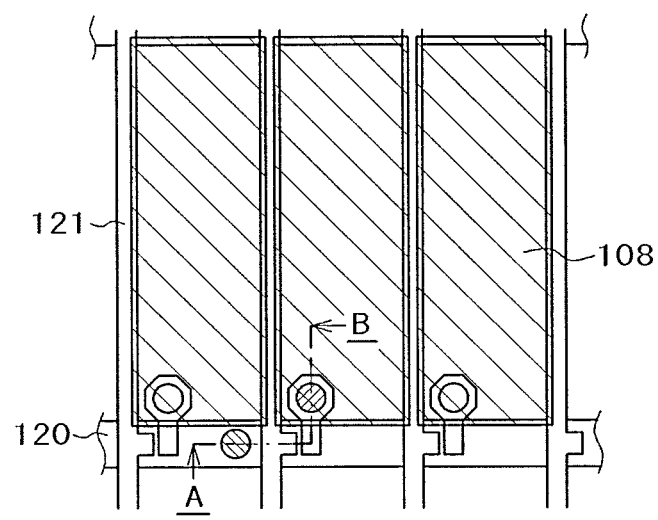
FIG. 4A is a plane view showing a TN or VA liquid crystal display device according to a third embodiment of the present invention.
Figure 4B:
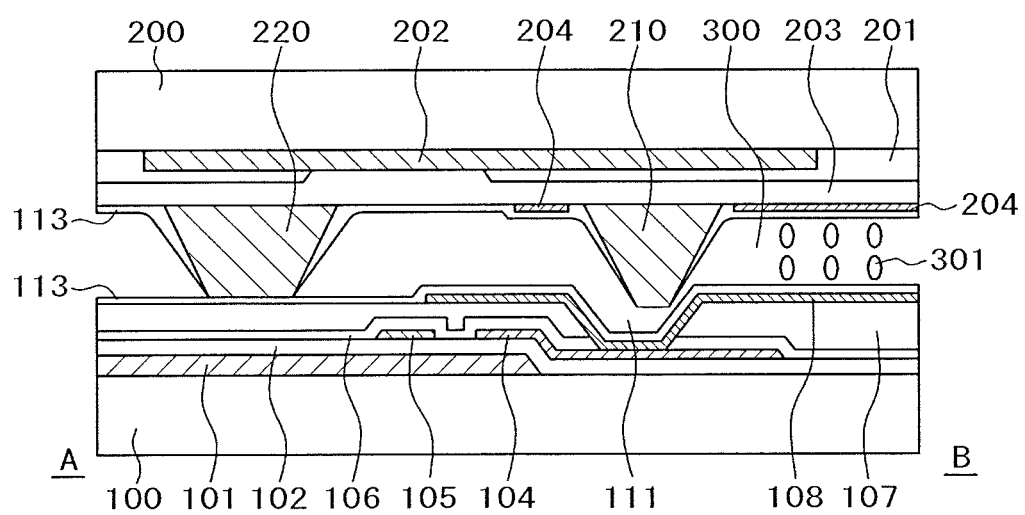
FIG. 4B is a cross-sectional view of a portion indicated with a line A-B in FIG. 4A.

FIGS. 4A and 4B show a liquid crystal display device according to a third embodiment of the present invention. In the third embodiment, the present invention is applied to a vertical electric field TN or VA liquid crystal display device provided with the contact hole 111 of a high transmittance pixel (using an organic PAS film).

FIG. 4A is a plane view showing a part of the VA (TN) liquid crystal display panel, and FIG. 4B is a cross-sectional view of a portion indicated with a line A-B in FIG. 4A.

In the vertical electric field liquid crystal display device, the pixel electrode 108 is arranged on the TFT substrate 100, and a common electrode 204 is arranged on the opposite substrate 200. By applying or not applying voltage to the pixel electrode 108, an array state of the liquid crystal molecules 301 of the liquid crystal layer 300 is changed to control transmission of light.

In the TN system, at zero electric field when voltage is not applied to the pixel electrode 108, the liquid crystal molecules 301 are arrayed in a horizontal direction with respect to both substrates to transmit light, and when voltage is started to be applied to the pixel electrode 108, the liquid crystal molecules 301 rise vertically to block light.

In the VA system, the liquid crystal layer 300 with negative dielectric anisotropy is arranged. At zero electric field when voltage is not applied to the pixel electrode 108, the liquid crystal molecules 301 are arrayed in a vertical direction to block light. With an electric field when voltage is applied to the pixel electrode 108, an electric field occurs between the pixel electrode 108 and the common electrode 204, and the liquid crystal molecules 301 incline in a horizontal direction to transmit light.

In the present embodiment also, the organic passivation film 107 on the TFT substrate 100 retains the contact hole 111 having the inclining part. Also, the tall columnar projection 210 and the short columnar spacer 220 are provided on the overcoat film 203 of the opposite substrate 200. The columnar projection 210 is provided at a position corresponding to that of the contact hole 111 of the TFT substrate 100, and when the TFT substrate 100 and the opposite substrate 200 are assembled, the columnar projection 210 is inserted to the contact hole 111. The columnar spacer 220 is provided at a position such that the columnar spacer 220 overlaps the light-shielding black matrix 202 of the opposite substrate 200, and overlaps for example the gate wiring 120 at a position corresponding to a portion other than the contact hole 111 of the TFT substrate 100, and when the TFT substrate 100 and the opposite substrate 200 are assembled, the columnar spacer 220 abuts on the orientation film 113 to ensure the cell gap. An action of the columnar projection 210 and the columnar spacer 220 is similar to that in the first embodiment.

Naturally, other than the above-described liquid crystal display devices, a configuration with the plane electrode and the comb-shaped electrode disclosed in FIGS. 1A and 1B may be a configuration of a pair of the comb-shaped electrodes. Also, not being limited to a method of driving the liquid crystal molecules oriented in a direction parallel with the liquid crystal substrate by using an electric field that is generated by a pair of electrodes formed on the TFT substrate and is parallel with the substrate, a method of driving the liquid crystal molecules oriented vertical to the substrate may be adopted.

INDUSTRIAL APPLICABILITY

The present invention can prevent occurrence of uneven brightness due to misalignment and a pressing load of upper and lower substrates of a liquid crystal display device. The present invention can be used for an IPS, VA, TN or other liquid crystal display. In particular, a more significant effect is achieved when the present invention is applied to a liquid crystal display with a large screen and a liquid crystal display using a phase difference polarizer for viewing angle compensation.

What is claimed is:

1. A display device, comprising:
   a first substrate having a plurality of TFTs, a passivation film, and a plurality of pixel electrodes; and
   a second substrate arranged with a gap with the first substrate;
   wherein the passivation film has a plurality of contact holes, and the plurality of pixel electrodes are connected to the plurality of TFTs via the plurality of contact holes;
   wherein the second substrate has a plurality of columnar spacers for ensuring the gap with the first substrate, and a plurality of columnar projections for misalignment prevention formed at positions corresponding to the contact holes;
   wherein the number of the plurality of columnar projections is less than the number of the plurality of columnar spacers; and
   wherein an interval between a pair of the plurality of columnar projections is larger than an interval between a pair of the plurality of columnar spacers.

2. A display device according to claim 1, wherein the passivation film includes an organic insulation film.

3. A display device according to claim 1, wherein the passivation film includes an inorganic insulating film.

4. A display device according to claim 1, wherein a difference Δh between the height h1 of one of the columnar projections and height h2 of one of the columnar spacers is equal to or less than depth z of the contact hole.

5. A display device according to claim 4, wherein each of the columnar projections abuts on a bottom part of each of the contact holes when an excessive force is applied thereto.

6. A display device according to claim 1, wherein height h1 of one of the columnar projections is larger than the gap d, and is smaller than a sum of the gap d and depth z of the contact hole.

7. A display device according to claim 1, wherein each of the contact holes has inclining part diameter which is larger at an upper part of the contact hole.

8. A display device according to claim 1, wherein a diameter of a top part of the columnar projection is smaller than a diameter of an upper part of the contact hole.

9. A display device according to claim 1, wherein a cross-sectional area of the columnar projection is smaller than a cross-sectional area of the columnar spacer.

10. A display device comprising:
a first substrate having a plurality of TFTs, a passivation film, and a plurality of pixel electrodes; and
a second substrate arranged with a gap with the first substrate;
wherein the passivation film has a plurality of contact holes, and the plurality of pixel electrodes are connected to the plurality of TFTs via the plurality of contact holes;
wherein the second substrate has a plurality of columnar spacers for ensuring the gap with the first substrate, and a plurality of columnar projections for misalignment prevention formed at positions corresponding to the contact holes;
wherein the number of the plurality of columnar projections is less than the number of the plurality of columnar spacers; and
wherein density of the plurality of columnar projections is higher at a peripheral area of the display device than at a center area of the display device.

* * * * *